US006909572B2

(12) United States Patent
Ventura et al.

(10) Patent No.: US 6,909,572 B2
(45) Date of Patent: Jun. 21, 2005

(54) DISK DRIVE SYSTEM AND METHOD FOR OPERATING SAME

(75) Inventors: Gianluca Ventura, Milan (IT); Alberto Salina, Limibiate (IT); Alessandra Schenone, Cisliano (IT); Fabio Ramaioli, Melegnano (IT); Luca Anostini, Corsico (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 237 days.

(21) Appl. No.: 10/431,336

(22) Filed: May 7, 2003

(65) Prior Publication Data

US 2004/0223251 A1 Nov. 11, 2004

(51) Int. Cl.[7] .............................................. G11B 21/02
(52) U.S. Cl. ........................................................ 360/75
(58) Field of Search .............................. 360/75, 69, 61; 318/560

(56) References Cited

U.S. PATENT DOCUMENTS

| | | | | |
|---|---|---|---|---|
| 4,679,102 A | * | 7/1987 | Wevers et al. | 360/75 |
| 5,508,874 A | * | 4/1996 | Williams et al. | 361/92 |
| 5,737,144 A | * | 4/1998 | Ataee et al. | 360/75 |
| 6,188,192 B1 | | 2/2001 | Chen | |

* cited by examiner

Primary Examiner—David Hudspeth
Assistant Examiner—K. Wong
(74) Attorney, Agent, or Firm—Carol W. Burton, Esq.; William J. Kubida, Esq.; Hogan & Hartson L.L.P.

(57) ABSTRACT

A disk drive system is described which includes a disk having a magnetic surface and a motor for rotating the disk, a magnetic head being movable relative to said magnetic surface. The motor generates a back electromotive force voltage having different phases and the system comprising a plurality of switches for switching the back electromotive force voltage, a control circuit to control the plurality of switches to supply the back electromotive force voltage to direct the head to a parking position. The system also comprises a comparator adapted to compare a single phase of the back electromotive force voltage with the sum of the other phases of the back electromotive force voltage. The comparator generates an output signal representative of the comparation and the system comprises a logic block controlled by the output signal of the comparator. The logic block is adapted to determine time periods and a control sequence of the switches which is associated to the time periods. The control sequence is supplied to the control circuit so that the last generates control signals to control the plurality of switches.

10 Claims, 3 Drawing Sheets

| T1/2 | T1 | T1 | T1 | T1 | T1 | T1/2 |
|---|---|---|---|---|---|---|
| HB | HA | HA | HC | HC | HB | HB |
| LC | LC | LB | LB | LA | LA | LC |

DISK DRIVE SYSTEM AND METHOD FOR OPERATING SAME

FIELD OF THE INVENTION

The invention refers to a disk drive system and a method for operating said disk drive system. Particularly said invention refers to a hard disk drive system and a method for operating said hard disk drive system.

BACKGROUND OF THE INVENTION

Contemporary hard disk drivers (HDD) typically include a brushless DC motor within which a disk rotating spindle assembly for rotating at least one data storage disk at a desirable velocity, typically in a range between 5,000 and 10,000 revolutions per minute, is provided. Storage disk devices such as a magnetic disk devices etc. have been widely utilised as a storage devices of a computer etc.

Hard disk drivers also typically include a rotary actuator structure powered by a Voice Coil Motor (VCM). The rotary actuator structure positions one or more transducer heads at desired locations relative to surfaces of the disk or disks. More precisely the VCM moves the head radially over the disk surface to thereby enables the head to be positioned over any annular track on the surface. In normal operation, the VCM, in response to control signals coming from the computer, positions the transducer head radially for recording data signals on or retrieving data signals from a preselected one of a set of concentric recording tracks on the disk.

The transducer head is supported above the disk surface by a film of air to prevent contact therebetween which might thereby otherwise damage one or both members. The head is typically designed to actually fly above the disk recording surface of height less than 50 microinches.

When the HDD is in power down condition the transducer head must be placed on a parking zone to avoid any mechanical damages determined by the contact between the head and the disk surface. The parking zone may find on the central part of the disk surface or outside the disk.

The placing of the head on the parking zone occurs even in emergency condition, that is in condition of high temperature or in presence of sudden knocks or when an electrical power failure slows the disk, which allows the head to settle into contact with the disk surface.

Generally all the modern disk drives incorporate means for moving the head on the parking zone; this means is even activated when the disk speed does not remain within tolerances, when a positional error is detected or when write circuits faults that could affect the stored data are detected.

A means for moving the head on the parking zone is disclosed in U.S. Pat. No. 6,188,192 wherein a disk drive system is described which includes a disk having a magnetic surface and supported for rotation on a spindle, a magnetic head being movable relative to the magnetic surface, and a spindle motor for driving the spindle. The motor generates a back electromotive force voltage, so called BEMF voltage, during an emergency condition and the system comprises a plurality of switches for switching said BEMF voltage and a plurality of comparators for comparing each phase of the BEMF voltage. The system comprises a control circuit adapted to control the plurality of switches to supply said BEMF voltage; the control circuit comprises a decoder and a latch and provides to rectify said BEMF voltage: This rectified BEMF voltage is supplied to the VCM which directs said head to a stored position.

The above mentioned disk drive system however is complex and presents high cost for its fabrication due above all to the use of at least three comparators one for each phase of the BEMF voltage.

SUMMARY OF THE INVENTION

In view of the state of the art described, it is an object of the present invention to provide a disk drive system which presents low fabrication cost.

According to the invention, such object is achieved by a disk drive system including a disk having a magnetic surface and a motor for rotating said disk, a magnetic head being movable relative to said magnetic surface, said motor generating a back electromotive force voltage having different phases, said system comprising a plurality of switches for switching said back electromotive force voltage, a control circuit to control said plurality of switches to supply said back electromotive force voltage to direct said head to a parking position, characterized by comprising a comparator adapted to compare a single phase of the back electromotive force voltage with the sum of the other phases of said back electromotive force voltage, said comparator generating an output signal representative of the comparation, said system comprising a logic block controlled by the output signal of the comparator and which is adapted to determine time periods and a control sequence of the switches which is associated to said time periods, said control sequence being supplied to the control circuit so that the last generates control signals to control said plurality of switches.

One method of operating a disk drive system in accordance with the present invention involves a system which includes a disk having a magnetic surface and a motor for rotating said disk and a magnetic head movable relative to the magnetic surface. The method involves the following steps: generating a back electromotive force voltage having different phases; switching the back electromotive force voltage by means of a plurality of switches; comparing a single phase of the back electromotive force voltage with the sum of the other phases of said back electromotive force voltage by means of a comparator; determining time periods and a control sequence of the switches associated to the time periods; generating control signals to control the switches according to said control sequence; and controlling the switches to supply the back electromotive force voltage to direct said head to a parking position.

BRIEF DESCRIPTION OF THE DRAWINGS

The features and the advantages of the present invention will be made evident by the following detailed description of an embodiment thereof which is illustrated as not limiting example in the annexed drawings, wherein.

DETAILED DESCRIPTION

Figure 1:
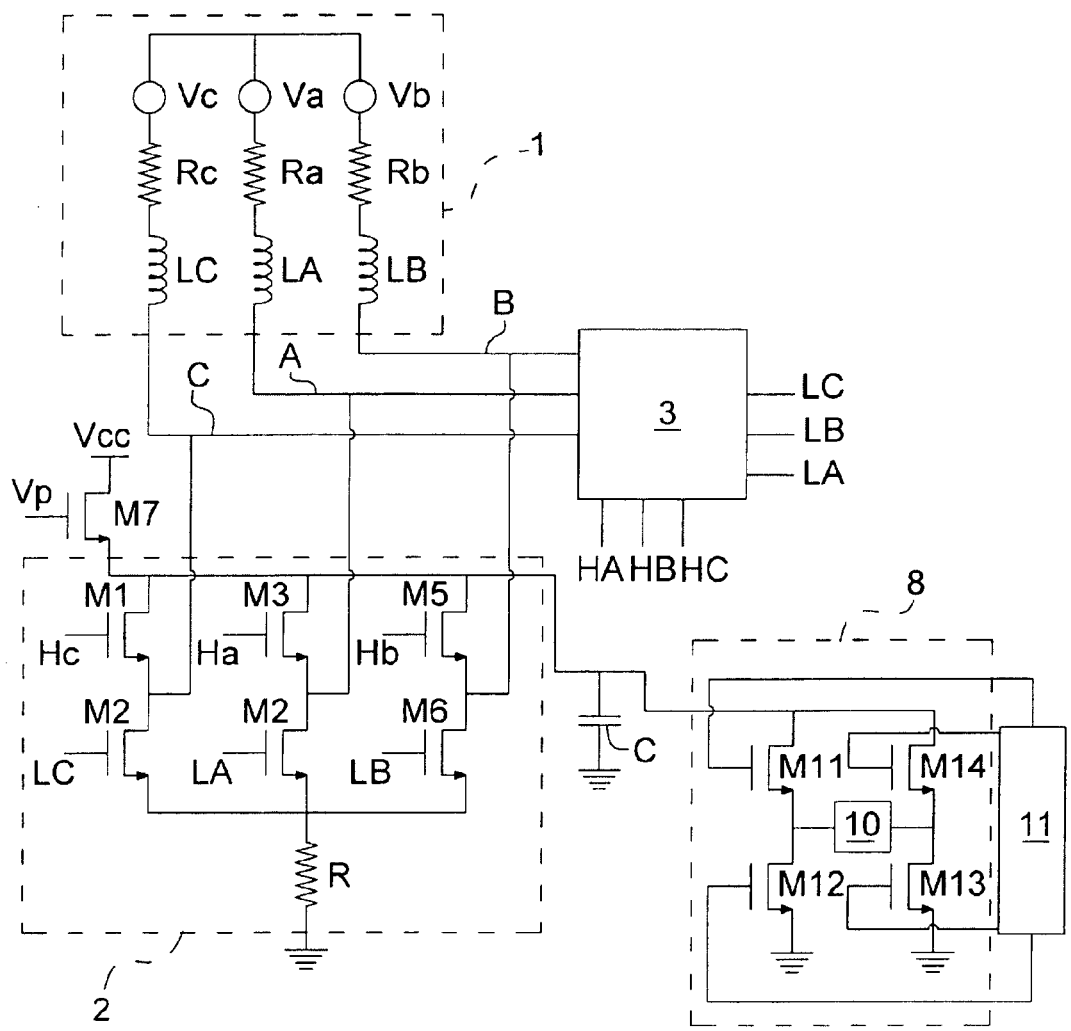
FIG. 1 shows a circuit scheme of a disk drive system according to present invention.

As illustrated in FIG. 1, a spindle motor 1 is connected to a three-phase H bridge power MOS 2 adapted to control said spindle motor 1; said spindle motor is adapted to move a magnetic disk. Said motor 1 is three phases motor comprising three phase voltage generators Va, Vb and Vc connected with respective inductance La–Lc in turn connected with respective resistors Ra–Rc. Controls signals to control the operation of the motor 1 are input to the respective gate terminals of the MOS transistors M1–M6 of the three-phase H bridge power MOS 2. The transistor M3 is connected with the transistor M4 to form a control circuit for a phase A of the motor 1; additionally the transistors M5 and M6 are connected together to form a control circuit for a phase B of the motor 1 and the transistors M1 and M2 are connected together to form a control circuit for a phase C. The drain terminals of the transistor M1, M3 and M5 are connected together while the source terminals of the transistors M2, M4 and M6 are connected together. A transistor M7 provide to connect the common line of the drain terminals of the transistor M1, M3 and M5 with the supply voltage Vcc by means of a voltage Vp normally applied at the gate terminals of the transistor M7. However, in emergency condition or in power down condition, the gate terminals of the transistor M7 is grounded by eliminating the connection between the circuit 2 and the supply voltage Vcc. The common line of the source terminals of the transistors M2, M4 and M6 is connected to ground by means of a resistor R.

The VCM 10 is adapted to move a transducer head radially over the surface of the disk and to place said head over any annular track of the disk. A circuit 8 formed by a H-bridge of MOS transistors M11–M14 is connected with the common line of the drain terminals of the transistor M1, M3 and M5. The gate terminals of the transistors M11–M14 are connected with a control circuit 11 adapted to drive the transistors M11–M14 in such a way that the current flows in one path through the transistor M11, the VCM 10 and the transistor M13 or in another path through the transistor M14, the VCM 10 and the transistor M12 to drive the VCM motor either one way or another in accordance with the direction that the head is desired to travel.

Figure 2:
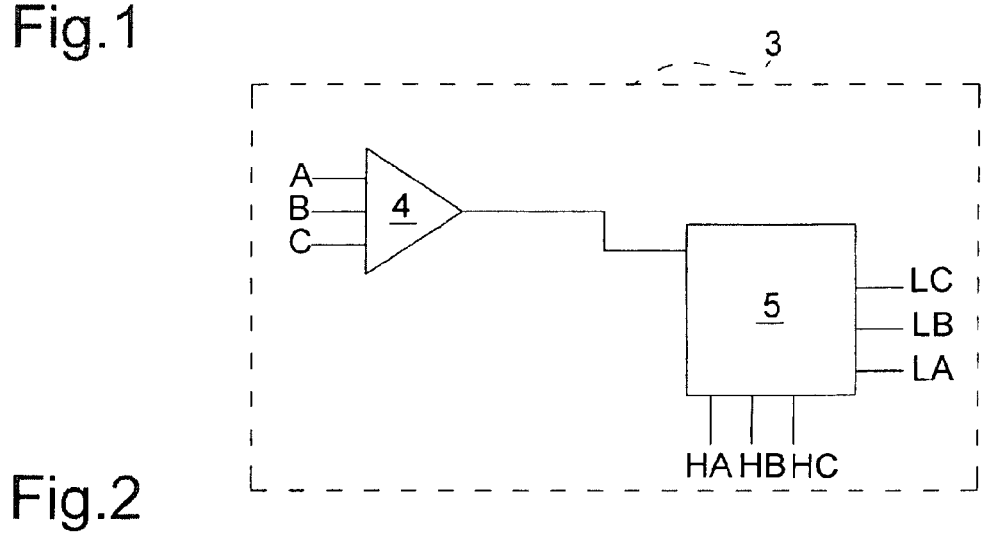
FIG. 2 shows in more detail the block 3 in FIG. 1.
Figure 3:
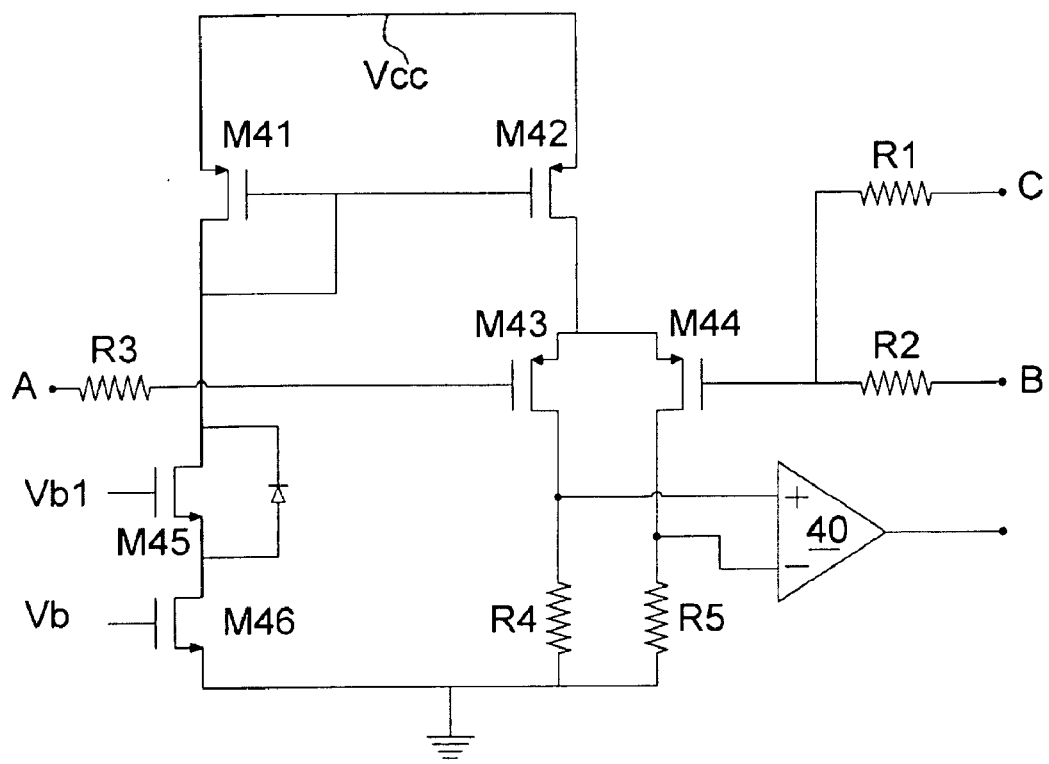
FIG. 3 shows the comparator belonging to the block 3 in FIG. 2.

The block 3 includes a comparator circuit 4 and a logic circuit 5, as illustrated in FIG. 2. The input terminals of the comparator circuit 4 are connected with the phase A–C of the motor 1 while the logic circuit 5 has one input terminal connected with the output terminal of the comparator circuit 4. The logic circuit 4 generates the output signals HA–HC and LA–LC which control respectively the transistors M3, M5, M1 and M4, M6 and M2; more precisely the logic circuit 5 generates the aforementioned signals only in power down or in emergency condition.

The comparator circuit 4 is fabricated in such a way to compare the sum of the two phases C and B and the phase A.

The comparator circuit 4 comprises three resistors R1, R2 and R3 connected respectively with the phases C, B and A at first terminals. The resistors R1 and R2, which are equal value, are connected to each other at the second common terminal connected in turn with a gate terminal of a PMOS transistor M44, while the resistor R3, which has a value equal to or different from that of the resistor R1 or R2, has the second terminal connected with a gate terminal of a PMOS transistor M43. The transistors M43 and M44 are the source terminals connected with each other and with a drain terminal of a PMOS transistor M42 coupled in mirror configuration with a PMOS transistor M41. The last mirrors the current flowing through it and which flows through two NMOS transistors M45 and M46 which are connected in series between the drain terminal of the transistor M41 and ground and are biased by means of respective voltages VB1 and VB which find at gate terminals thereof. The drain terminals of the transistors M43 and M44 are connected with respective first terminals of resistors R4 and R5 the second terminals of which are connected to ground; the drain terminals of the transistors M41 and M42 are connected with the voltage Vcc. The drain terminals of the transistors M43 and M44 are connected respectively with the inverting and the non-inverting terminals of a comparator 40 the output of which represents the output of the comparator circuit 4. The output signal of the comparator 40 may assume the values ground or Vdd.

The comparator circuit 4 is sensitive to the passage for the zero voltage value of the phase A. In fact the comparator 40 changes the output value when the voltage of the phase A assumes the zero value.

Figure 4:
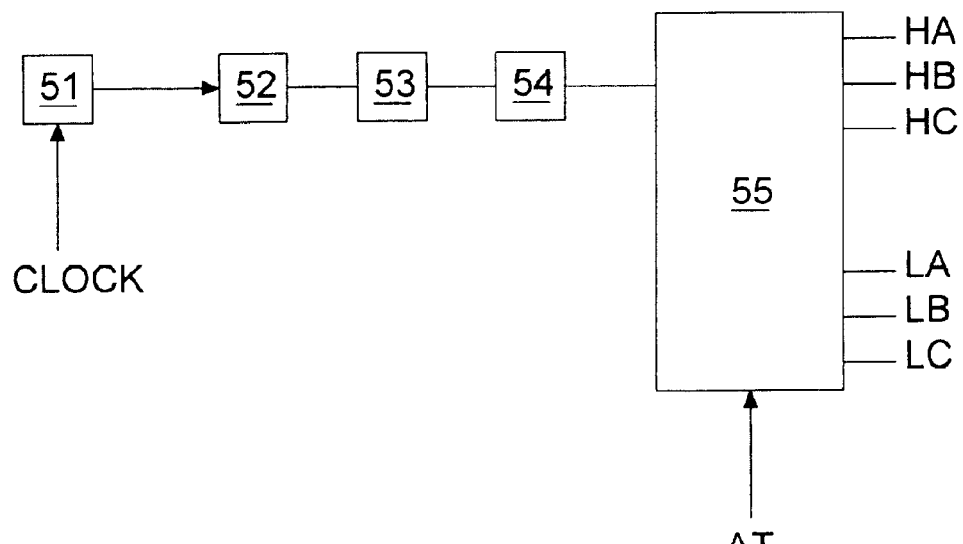
FIG. 4 shows the logic circuit of the block 3 in FIG. 2.

The BEMF voltage generates by the spindle motor 1 is shown in FIG. 4. More precisely three phases of the of the BEMF voltage are shown in FIG. 4, the phase A, the phase B and the phase C. The phases A–C are sinusoidal voltages and in each period T1 corresponding to the evolution of 60 degrees of a phase, only two of said three phases assume the maximum value, in absolute value, with respect to the other phase. Therefore the transistors M1–M6 must be suitably driven in order to obtain the maximum voltage variation on the VCM 10. A capacitor C provides to store the charge by synchronous rectification of the spindle motor by properly controlling the three half-bridges of the spindle motor.

Figures 5, 6:
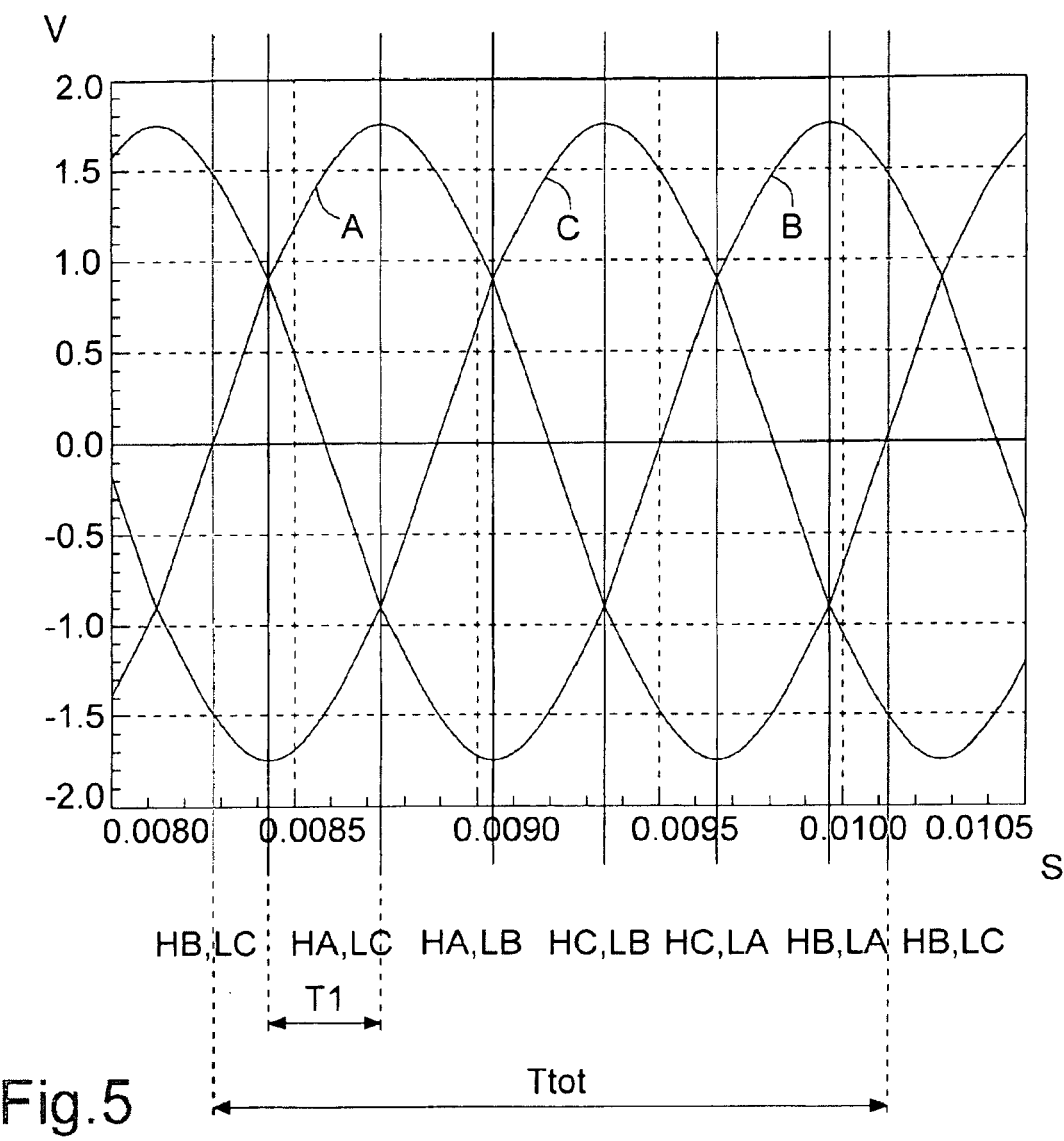
FIG. 5 shows the three phases of the BEMF voltage generated by the spindle motor in FIG. 1.
FIG. 6 shows a logic sequence associated to a time periods which are determined by the logic circuit in FIG. 4.

For obtaining this result the logic circuit 5 comprises a counter 51 which is activated when the output signal of the comparator circuit 4 changes voltage value, more precisely when the phase A assume a positive value, and which is deactivated when the output signal of the comparator 40 changes newly voltage value. Therefore the counter 51 counts the time period Ttot between a value change and the successive value change of the output signal of the comparator 40, that is the time period between one and a successive zero crossing of the phase A; an external clock signal CLOCK acts on the counter. A register 52, which is activated by the same output signal of the comparator circuit 4, stores the period time Ttot counted by the counter 51. A time divider 53 provides to divide the time period Ttot by six time period T1 (which corresponds to the evolution of 60 degrees of a phase) because, as aforementioned, in each time period T1 two of three phases A, B and C assume the maximum value in absolute value with respect to the other phase. A logic device 54 associates to each time period T1 the turning on of two of the six transistors M1–M6 by means of two of the control signals HA–HC and LA–LC according to a control sequence defined in the table shown in FIG. 6. In said control sequence the first time period T1 is divided by two (T1/2) because the phases that have the maximum voltage value, in absolute value, in this first time period T1/2 are the phases B and C and therefore the transistor M5 and M2 must be turned on. In the second time period T1 the phases that have the maximum voltage value, in absolute value, are the phases A and C and therefore the transistor M3 and M2 must be turned on. In the third time period T1 the phases that have the maximum voltage value, in absolute value, are the phases A and B and therefore the transistor M3 and M6 must be turned on.

Said control sequence is supplied to a control device 55 adapted to generate the signals HA–HC and LA–LC to send to the gate terminals of the transistors M1–M6. An external signal AT acts on the control device 55 for allowing to send the signals HA–HC and LA–LC only in power down condition or in emergency condition.

What is claimed is:

1. A disk drive system comprising:
   a disk having a magnetic surface;
   a motor for rotating said disk and for generating a back electromotive force voltage having different phases;
   a magnetic head being movable relative to said magnetic surface;
   a plurality of switches for switching said back electromotive force voltage;
   a control circuit to control said plurality of switches to supply said back electromotive force voltage to direct said head to a parking position;
   a comparator for comparing a single phase of the back electromotive force voltage with the sum of other phases of said back electromotive force voltage, and for generating an output signal representative of the comparison; and
   a logic block controlled by the output signal of the comparator for determining time periods and for generating a control sequence associated with said time periods, said control sequence being supplied to the control circuit.

2. The system of claim 1, wherein said control sequence assures the activation of the switches associated with phases of the back electromotive force that have an absolute maximum value in one of said time periods.

3. The system of claim 1, wherein said logic block further comprises a counter for counting the time interval between a value change and a successive value change of said output signal of the comparator, and a time divider for dividing said time interval in said time periods.

4. The system of claim 3, wherein said back electromotive force comprises three phases, said time divider divides said time interval in six time periods and said control sequence closes the switches associated with two phases of the back electromotive force that have an absolute maximum value, with respect to the other phase in each one of said six time periods.

5. The system of claim 1, wherein said motor comprises a spindle motor.

6. A method for operating a disk drive system including a disk having a magnetic surface, a motor for rotating said disk, and a magnetic head being movable relative to said magnetic surface, said method comprising:
   generating a back electromotive force voltage having different phases:
   switching said back electromotive force voltage with a plurality of switches;
   controlling said plurality of switches to supply said back electromotive force voltage to direct said head to a parking position;
   comparing a single phase of the back electromotive force voltage with the sum of other phases of said back electromotive force voltage with a comparator;
   determining time periods and a control sequence for the switches associated with said time periods; and
   generating control signals to control said plurality of switches according to said control sequence.

7. The method of claim 6, wherein said control sequence assures the activation of the switches associated with the phases of the back electromotive force that have an absolute maximum value in one of said time periods.

8. The method of claim 6, wherein determining time periods comprises counting the time interval between a value change and a successive value change of an output signal of the comparator, and dividing said time interval in said time periods.

9. The method of claim 8, wherein said back electromotive force comprises three phases, said time interval being divided into six time periods and said control sequence closes the switches associated to two phases of the back electromotive force that have an absolute maximum value with respect to the other phase in each one of said six time periods.

10. The method of claim 6, further comprising providing a spindle motor for rotating said disk.

* * * * *